United States Patent
Ninan

(10) Patent No.: US 10,440,379 B2
(45) Date of Patent: Oct. 8, 2019

(54) TECHNIQUES FOR ENCODING, DECODING AND REPRESENTING HIGH DYNAMIC RANGE IMAGES

(71) Applicant: Dolby Laboratories Licensing Corporation, San Francisco, CA (US)

(72) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/110,061

(22) PCT Filed: Jan. 6, 2015

(86) PCT No.: PCT/US2015/010299
§ 371 (c)(1),
(2) Date: Jul. 6, 2016

(87) PCT Pub. No.: WO2015/105790
PCT Pub. Date: Jul. 16, 2015

(65) Prior Publication Data
US 2016/0353123 A1    Dec. 1, 2016

Related U.S. Application Data

(60) Provisional application No. 61/924,345, filed on Jan. 7, 2014.

(51) Int. Cl.
*G06K 9/36* (2006.01)
*H04N 19/44* (2014.01)
(Continued)

(52) U.S. Cl.
CPC .......... *H04N 19/44* (2014.11); *G06F 21/602* (2013.01); *H04N 5/2355* (2013.01);
(Continued)

(58) Field of Classification Search
None
See application file for complete search history.

(56) References Cited

U.S. PATENT DOCUMENTS 6,473,859 B1 * 10/2002 Enokida ................. H04N 19/30
375/E7.239
8,514,934 B2    8/2013 Ward
(Continued)

FOREIGN PATENT DOCUMENTS

JP    2002-538536    11/2002
JP    2008-060891    3/2008
(Continued)

OTHER PUBLICATIONS

Hamilton, Eric. "JPEG file interchange format." (2004). (Year: 2004).*
(Continued)

*Primary Examiner* — Sean M Conner

(57) ABSTRACT

Techniques for high dynamic range image processing are presented. Base layer data, first checksum parameter, and residual ratio data for a high dynamic range (HDR) image are each received. A second checksum parameter is computed for the base layer data based upon the first SOF after the last APP11 marker segment and includes all following bytes up to and including the EOI marker. The first and second checksum parameters are compared to determine if base layer has been altered.

14 Claims, 4 Drawing Sheets

(51) Int. Cl.
  *H04N 5/235* (2006.01)
  *H04N 19/184* (2014.01)
  *H04N 19/467* (2014.01)
  *H04N 19/36* (2014.01)
  *H04N 19/186* (2014.01)
  *G06F 21/60* (2013.01)

(52) U.S. Cl.
  CPC ......... *H04N 19/184* (2014.11); *H04N 19/186* (2014.11); *H04N 19/36* (2014.11); *H04N 19/467* (2014.11)

(56) References Cited

U.S. PATENT DOCUMENTS

| | | | |
|---|---|---|---|
| 2004/0039912 A1 | 2/2004 | Borrowman | |
| 2004/0258301 A1* | 12/2004 | Payton | H04N 1/64 382/166 |
| 2005/0276114 A1* | 12/2005 | Tsunekazu | G06F 13/385 365/185.22 |
| 2012/0070128 A1* | 3/2012 | Kato | G06F 21/10 386/259 |
| 2012/0281009 A1* | 11/2012 | Ward | H04N 9/67 345/589 |
| 2012/0314944 A1* | 12/2012 | Ninan | H04N 19/647 382/166 |
| 2013/0064462 A1 | 3/2013 | Ninan | |
| 2015/0016735 A1* | 1/2015 | Kikuchi | G06T 9/00 382/232 |
| 2015/0201222 A1* | 7/2015 | Mertens | H04N 19/46 382/233 |
| 2016/0301959 A1* | 10/2016 | Oh | H04N 21/234327 |
| 2017/0048561 A1* | 2/2017 | Oh | H04N 21/23 |

FOREIGN PATENT DOCUMENTS

| | | |
|---|---|---|
| RU | 2433477 | 11/2011 |
| WO | 2010/126451 | 11/2010 |
| WO | 2012/142589 | 10/2012 |

OTHER PUBLICATIONS

Marcellin, Michael W., et al. "An overview of JPEG-2000." Proceedings DCC 2000. Data Compression Conference. IEEE, 2000. (Year: 2000).*
Ishikawa, Takaaki, newest trend of JPEG New Project, Waseda University, Jul. 19, 2013, pp. 1-25.
Ebrahimi, T. et al "A JPEG Backward-Compatible HDR Image Compression" Applications of Digital Image Processing, vol. 8499, SPIE, pp. 1-12, Oct. 15, 2012.
Ward, G. et al "JPEG-HDR: A Backwards-Compatible, High Dynamic Range Extension to JPEG" ACM SIGGRAPH, Jan. 1, 2006, p. 3.
Fletcher, J.G. "An Arithmetic Checksum for Serial Transmissions" IEEE Transactions on Communications, vol. 30, Issue 1, pp. 247-252, published on Jan. 1982.
Recommendation ITU-R BT.601-7, "Studio Encoding Parameters of Digital Television for Standard 4:3 and Wide-Screen 16:9 Aspect Ratios" Mar. 2011.
Reinhard, E. et al "Photographic Tone Reproduction for Digital Images" ACM Transactions on Graphics, vol. 21, Issue 3, Jul. 2002, pp. 267-276.
ITU-T Rec. T81/ISO/IEC 10918-1:"Information Technology—Digital Compression and Coding of Continuous Tone Still Images—Requirements and Guidelines" published on Feb. 17, 1994.
ITU-T Rec. T.86/ISO/IEC 109818-4:Information Technology—Digital Compression and Coding of Continuous-Tone Still Images; Registration of JPEG Profiles, SPIFF Profiles, SPIFF Tags, SPIFF Colour Spaces, APPn Markers, SPIFF Compression Types and Registration Authorities (REGAUT Jun. 1998.
ITU-T Rec.T.871/ISO/IEC 10918-5: "Information Technology—Digital Compression and Coding of Continuous-Tone Still Images: JPEG File Interchange Format (JFIF)", May 2011.
ISO/IEC 15444-1:2004: "Information Technology—JPEG 2000 image Coding System: Core Coding System" published on Sep. 15, 2004, number of pp. 194.
ISO/IEC/IEEE 60559:2011 "Information Technology—Microprocessor Systems, Floating Point Arithmetic" Published on Jun. 1, 2011, number of pp. 58.

* cited by examiner

| APP11 2 Bytes | Length 2 Bytes | ID String "DD" | Null Byte | Data |
|---|---|---|---|---|

Type 1 Parameter ASCII Segment

| Type 1 Bytes | Profile Byte | Version Byte | Segment Index 2 Bytes | Payload ASCII Parameter Data Max (64k − 12) |
|---|---|---|---|---|

Type 2 Residual Segment

| Type 1 Bytes | Segment Index 2 Bytes | Payload Data Max (64k − 9) |
|---|---|---|

Type 3 Parameter Binary Segment

| Type 1 Bytes | Profile Byte | Version Byte | Segment Index 2 Bytes | Payload Binary Parameter Data Max (64k − 12) |
|---|---|---|---|---|

FIG. 3

TECHNIQUES FOR ENCODING, DECODING AND REPRESENTING HIGH DYNAMIC RANGE IMAGES

CROSS-REFERENCE TO RELATED APPLICATIONS

This application claims the benefit of priority to U.S. Provisional Patent Application No. 61/924,345 filed 7 Jan. 2014, which is hereby incorporated by reference in its entirety.

TECHNOLOGY OF THE INVENTION

The present invention relates generally to high dynamic range digital images. The invention relates specifically to methods and apparatus for encoding and decoding high dynamic range images, whether still or moving pictures, and to data structures containing digital high dynamic range images.

BACKGROUND OF THE INVENTION

Human vision is capable of appreciating contrast ratios of up to 1:10,000. That is, a person can take in a scene in which some parts of the scene are 10,000 times brighter than other parts of the scene and see details in both the brightest and darkest parts of the scene. Further, human vision can adapt its sensitivity to brighter or darker scenes over a further 6 orders of magnitude.

Most conventional digital image formats (so-called 24-bit formats) use up to 24 bits to store color and luminance information for each pixel in an image. For example, each of a red, green and blue (RGB) value for a pixel may be stored in one byte (8 bits). Such formats are capable of representing brightness variations over only about two orders of magnitude (each byte can store one of 256 possible values). There exist a number of standard formats for representing digital images (which include both still and video images). These include JPEG (Joint Photographic Experts Group), MPEG (Motion Picture Experts Group), AVI (Audio Video Interleave), TIFF (Tagged Image File Format), BMP (Bit Map), PNG (Portable Network Graphics), GIF (Graphical Interchange Format), and others. Such formats may be called "output referred standards" because they do not attempt to preserve image information beyond what can be reproduced by electronic displays of the types most commonly available. Until recently, displays such as computer displays, televisions, digital motion picture projectors and the like have been incapable of accurately reproducing images having contrast ratios better than 1:1000 or so.

Display technologies being developed by the assignee, and others, are able to reproduce images having high dynamic range (HDR). Such displays can reproduce images which more faithfully represent real-world scenes than conventional displays. There is a need for formats for storing HDR images for reproduction on these displays and other HDR displays that will become available in the future.

A number of formats have been proposed for storing HDR images as digital data. These formats all have various disadvantages. A number of these formats yield prohibitively large image files that can be viewed only through the use of specialized software. Some manufacturers of digital cameras provide proprietary RAW formats. These formats tend to be camera-specific and to be excessive in terms of data storage requirements.

There is a need for a convenient framework for storing, exchanging, and reproducing high dynamic range images. There is a particular need for such a framework which is backwards compatible with existing image viewer technology.

BRIEF DESCRIPTION OF DRAWINGS

The present invention is illustrated by way of example, and not by way of limitation, in the figures of the accompanying drawings and in which like reference numerals refer to similar elements and in which:

FIG. 3 illustrates exemplary data contained in an APP11 header segment, according to an embodiment of the present invention;

DESCRIPTION OF EXAMPLE POSSIBLE EMBODIMENTS

Figure 1:
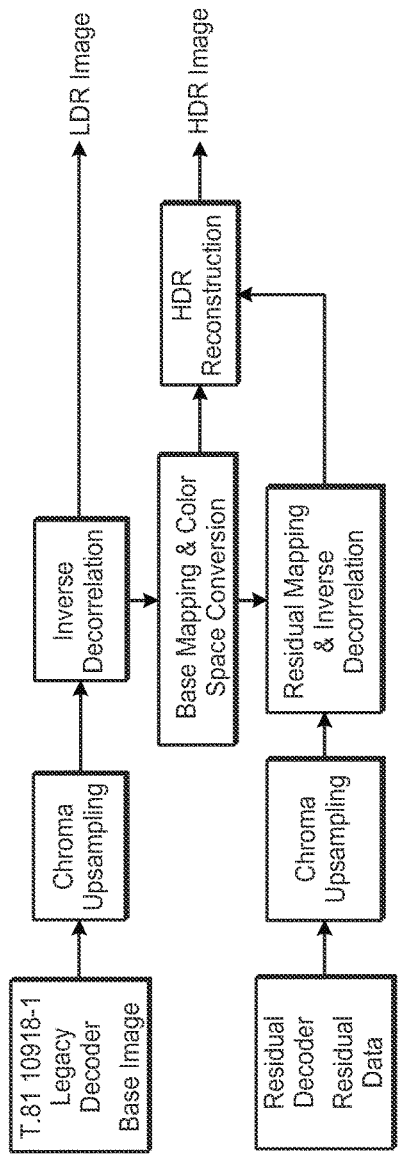
FIG. 1 illustrates an exemplary decoding process, according to an embodiment of the present invention.

Example possible embodiments, which relate to HDR encoding, decoding, and data structures, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention. That said, U.S. Pat. No. 8,514,934, entitled "Apparatus and methods for encoding, decoding, and representing high dynamic range images," is incorporated by reference herein for all purposes.

According to one embodiment of the present invention, an HDR data structure is configured to be readable by legacy image viewers. The legacy image viewers can read a tone map information and ignore HDR information, such as a ratio data (as explained later). In some embodiments, the data structure comprises a JFIF file and the tone map information comprises a JPEG image. In some embodiments, the data structure comprises a MPEG file and the tone map information comprises a frame of a MPEG video.

Another aspect of the invention provides a data structure for representing a high dynamic range image having an initial dynamic range. The data structure comprises a tone map portion and a high dynamic range information portion. The tone map portion contains tone map information representing the image and has a dynamic range less than the initial dynamic range. The high dynamic range information portion contains information describing ratios of (luminance) values in the tone map portion to luminance values of the high dynamic range image.

Residual Ratio Image

One aspect of this invention provides methods for encoding high dynamic range image data. The methods involve obtaining, or otherwise generating, a tone map information corresponding to the high dynamic range image data. The tone map information has a dynamic range lower than that of the high dynamic range image data. The method computes ratio data comprising ratios of values in the high dynamic range image data and corresponding values in the tone map information. The ratio data (or derivative information therefrom) and the tone map information can be stored and transmitted for decoding.

Another aspect of this invention provides methods for decoding a codestream to reconstruct a high dynamic range image. The methods involve receiving, or otherwise accessing, a tone map information and corresponding ratio data (or derivative information therefrom). The method computes a high dynamic range image utilizing the values in the tone map information and corresponding ratio data.

Ratio data, as referred to in this application in its entirety, can be computed, without limitation, (i) as mathematical division of numerator and denominator values, including without limitation, further mathematical operations—such as logarithm of the ratio, or (ii) alternatively, as subtraction of two logarithmic values, including without limitation, further mathematical operations. Typically, ratio data describes luminance, but can be used for chroma channels (e.g., Cr, Cb) as well. For the sake of clarity, ratio data is sometimes described herein as residual data or included with residual data.

FIG. 1 illustrates an exemplary decoding process according to an embodiment of the present invention. The process begins with a legacy decoder block which reconstructs the base image. This image is then optionally chroma upsampled, followed by an inverse decorrelation block. The output of this transformation is a low-dynamic range, backward compatible image with eight bits per sample in, for example, an RGB-type color space.

The low-dynamic range components are further mapped by the base mapping and color space conversion block to a floating point image which is called a precursor image. The precursor image is optionally converted to HDR color space and luminance can be calculated. The noise level maybe used to avoid division by zero and to reduce the compression artifacts which can be amplified in following blocks.

The residual decoder path uses the residual data that is embedded in the codestream in the APP11 markers. This data is reconstructed and then optionally upsampled. It is then processed by a residual mapping and inverse decorrelation block. This block maps the residual data to floating point domain which is optionally inversely decorrelated. This mapping can use the luminance computed by the base mapping and color space conversion block. The mapped residual data and the precursor image are processed by the HDR reconstruction block to produce a reconstructed HDR Image.

Figure 2:
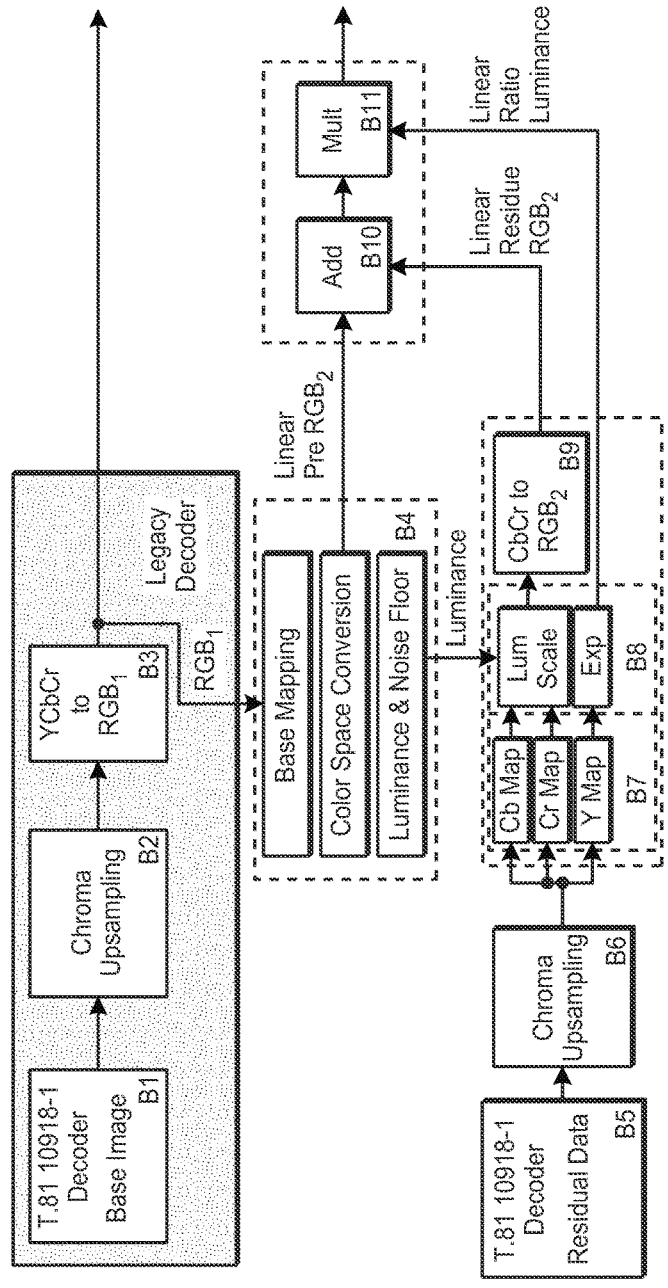
FIG. 2 illustrates exemplary decoding process, according to another embodiment of the present invention.

FIG. 2 illustrates exemplary decoding process according to another embodiment of the present invention. The decoding process relies on a layered approach by decomposing an HDR image into a base layer and an HDR residual ratio layer. The base layer is a tone mapped image tone mapped from the original floating point HDR with either a local or global tonemapper. This codestream will be the backwards compatible with, accessible by, legacy decoders. The residual ratio layer contains HDR quantized log luminance ratio and the chrominance residual difference, this data is put together and represented as a single residual ratio image.

Since the residual data is hidden in the APP11 markers, legacy decoders can skip over this residual image and only access the base image codes stream, and thus this decoding process is backwards compatible. However, decoders implementing the present invention can combine the two layers to reconstruct an HDR image.

In FIG. 2, the upper path which comprise of blocks B1, B2, and B3 can be the standard flow of a legacy decoder and outputs a backwards compatible lower dynamic range (LDR) image in typically sRGB space. This base image data is then mapped into linear HDR space and processed by the color space conversion operation in block B4. This block converts the LDR image into the color space of the original HDR image, and it also maps the image to floating point value and called linear pre RGB2, it can also be referred to as "LP_RGB2." A noise floor value specified in the parameter codestream is added to the luminance component of the LP_RGB2 to avoid divide by 0 and to avoid amplifying any noise that could occur due to operations downstream from this block B4 for small values.

In FIG. 2, the lower path starting from B5 begins with the residual data of the high-dynamic range image, and is represented by the ISO/IEC 10918-1 codestream format (which is incorporated by reference for all purposes, and to show desired formats). This codestream is embedded in the APP11 marker as a residual data segment described below. After being decoded by the decoder the chroma upsampling step is performed by B6 to bring all components to full resolution, e.g., 4:4:4.

The residual ratio data is then separated by B7 into floating point linear ratio luminance values and a linear residual color difference value. The incoming residual luminance values are inverse quantized according to parameters in the codestream. A specific embodiment, this is either provided by an explicit lookup table in the parameter segment in the codestream. If this table is not present, then using the min and max, referred to as ln1, ln0 in the parameters segment, and an inverse log map is calculated. Similarly, the incoming chroma residual sample values are inverse quantized according to the minimum and maximum parameters stored in the parameter segment of the codestream as cb0, cb1 and cr0, cr1, if present.

The chroma values are then processed by B8, the YCbCr to RGB2 block and will convert the linear dequantized YCbCr to a linear residue RGB2 in the HDR color space, alternatively referred to as "LR_RGB2." Finally, blocks B9 and B10 constructs an HDR image by first adding the linear pre RGB2 to the linear residue RGB2 in B9 and then multiplying the result by the linear ratio luminance in B10.

APP11 Marker

As shown in FIG. 3, the APP11 marker segment is broken into a parameter data segment and a data segment. The parameter segment has two or more (e.g., 3) types of segments, such as a parameter ASCII type segment, residual segment, and a parameter binary type segment. This structure for the APP11 marker segment can be used in connection with any embodiment of the invention described herein, including without limitation, the exemplary embodiments reflected in FIGS. 1 and 2.

Checksum for Edit Detection

A parameter data segment (PDS) carries parameters encoded, as ASCII or binary text, as payload data. The last parameter in the segment is a checksum of the base layer codestream. In a specific embodiment, the ckb (ASCII) or chksum (binary, 16 bits) parameter is a checksum of the base layer codestream computed by summing all bytes in the base layer codestream. The checksum includes the first SOF (e.g., start of frame) marker after the last APP11 marker segment and includes all following bytes up to and including the EOI (e.g., end of frame) marker. It can be used by the decoder to detect an edit of the base layer, which may result in undesirable artifacts when the high dynamic range (HDR) image is decoded. In a specific embodiment, the checksum is position (or order) dependent, such as a Fletcher's checksum (e.g., Fletcher-16, Fletcher-32, Flectcher-64). See Fletcher, J. G. (January 1982). "An Arithmetic Checksum for Serial Transmissions," IEEE Transactions on Communications, COM-30 (1): 247-252 for additional information, which is incorporated herein by reference for all purposes.

In an alternative embodiment, the PDS can indicate the use of a more complex hash algorithm than checksum. A more complex hash algorithm reduces the possibilities of hash collisions, e.g., undetectable alterations in the data when different input data results in same hash value. According, a hash value generated for the original base layer should probabilistically be unlikely to match if the base layer is altered. Exemplary hash functions can be, or implemented by:

(i) nonlinear lookup table;
(ii) cryptographic hash function (e.g., HAIFA, Merkle-Damgård, unique block interation, and the like);
(iii) non-cryptographic hash function (xor, product, addition, rotation);
(iv) randomized that selects a hashing function among a predefined set;
(v) cyclic redundancy check(s); and
(vi) checksum(s)—e.g., Fletcher, Adler-32.

In yet other alternative embodiments, fingerprinting or media watermarking techniques can be signaled by the PDS and verified during decoding or image reproduction/rendering.

The checksum, hash function or the other described alternatives for base layer edit detection can be used in connection with any embodiment of the invention described herein, including without limitation, the exemplary embodiments reflected in FIGS. 1 and 2. Additionally, based on the teaching herein, a checksum, hash function or alternative can be used for edit detection of the residual ratio layer too.

Encryption/Decryption of the Residue Layer Implemented on a Per Segment Basis

Another parameter within the PDS or elsewhere can be an encryption parameter, such as an encryption key. This information can be used to decrypt the ratio residue layer, for example, on a per segment basis of the codestream. A segment can be an independently decodable sequence of entropy encoded bytes of compressed image data. In other words, according to an embodiment of the present invention, a different encryption parameter can be provided and used for each segment. The encryption parameter and associated processing can be used in connection with any embodiment of the invention described herein, including without limitation, the exemplary embodiments reflected in FIGS. 1 and 2.

Inverse Tone Mapping in the Degamma Lut/Mapping Lut

A degamma lookup table (LUT) described above (as block B4 in FIG. 2) is a 256 entry table loaded by a default Rec. 601 table (ITU-R Recommendation BT.601, available at http://www.itu.int/rec/R-REC-BT.601-7-201103-I/en, which is incorporated by reference) which is typically an inverse linear and power function of 2.4. If it is in an alternate color space, such as Adobe RGB by Adobe Systems, Inc., the look up table can be sent in header information. Additionally, the degamma LUT can include an inverse tone mapping function/curve, such as for reverse histogram equalization or inverse Reinhard tone mapper. In some cases, the degamma LUT with inverse tone mapping can reduce memory used for the residual ratio layer. For additional information on the Reinhard tone mapper, see http://www.cs.utah.edu/~reinhard/cdrom/tonemap.pdf ("Photographic Tone Reproduction for Digital Images"), which is incorporated by reference herein for all purposes.

Binary Header Segment

The APP11 marker segment can include binary parameter data, as shown as "Type 3" in FIG. 3. The Type 3 segment and its associated processing can be used in connection with any embodiment of the invention described herein, including without limitation, the exemplary embodiments reflected in FIGS. 1 and 2.

Segment Index and Start Location for that Segment

In an embodiment of the present invention, the span and extent of segments for residual ratio image need to be coincident with a base layer image. For example, a residual ratio image can be partitioned into a plurality of segments, contiguous and non-contiguous. A set of these segments of the residual ratio image need not correspond to a complete image, but can define one or more portions of an image. This functionality allows HDR reconstruction from a portion of the base layer image, but not the entire base layer image. For example, an encryption parameter can be provided for one segment (e.g., left half image, top half image) for HDR reconstruction, while residual ratio information for another segment (e.g., right half image, bottom half image) remains encrypted for limited base layer reproduction.

Figure 4B:
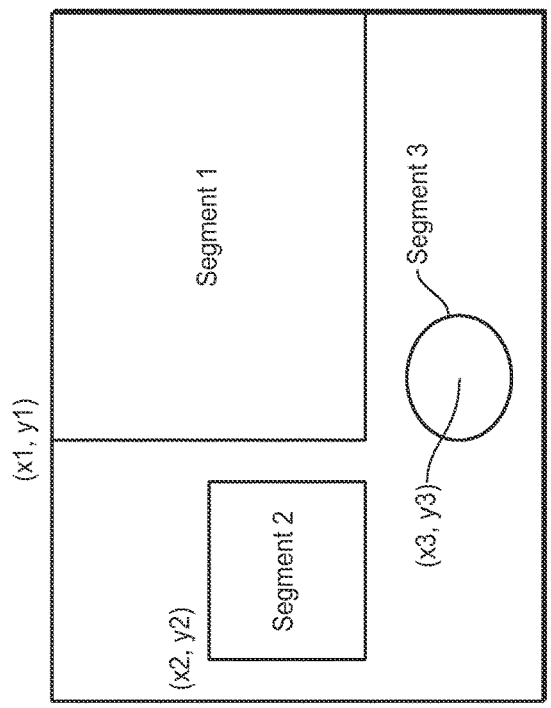
FIGS. 4A-4B illustrate exemplary segments for a residual ratio image.
Figure 4A:
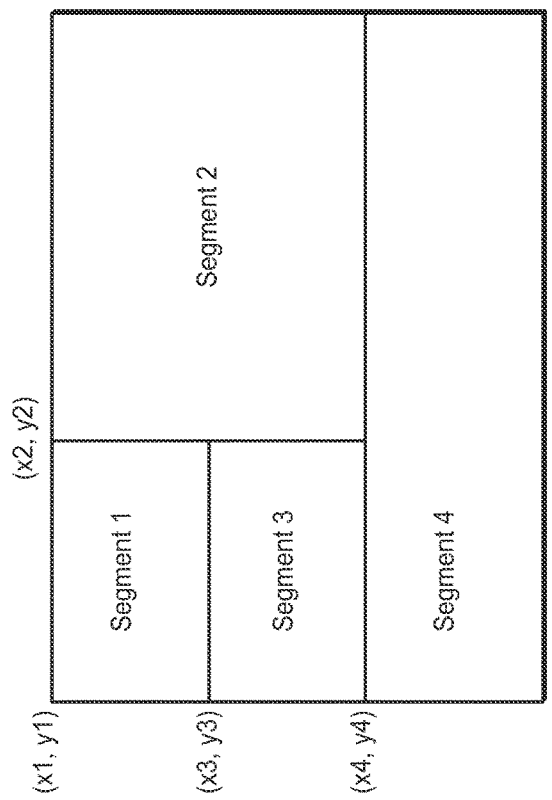

Each segment of the residual ratio image can be specified by coordinate references (e.g., x and y coordinates for one of the four corners if rectangular segment) and its length and width. If segment is a different geometric shape, then it can be defined by a center position and a radius/diameter or the like. FIGS. 4A-4B illustrate exemplary segments of the residual ratio image, which can used in connection with any embodiment of the present invention, including without limitation, the exemplary embodiments reflected in FIGS. 1 and 2.

Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
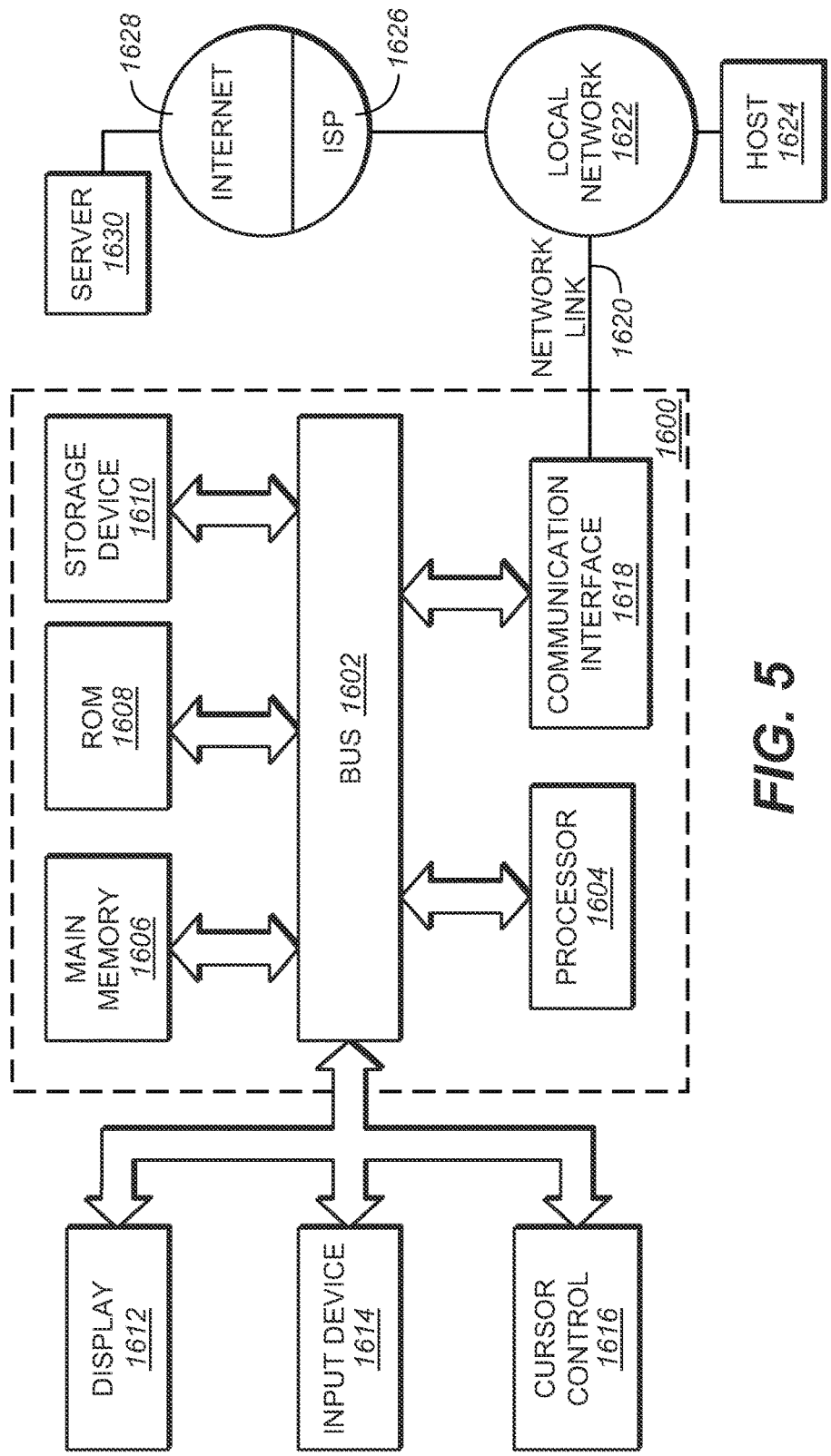
FIG. 5 illustrates an example hardware platform on which a computer or a computing device as described herein may be implemented.

For example, FIG. 5 is a block diagram that illustrates a computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a liquid crystal display, for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques as described herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ADDITIONAL REFERENCES

The following references, in addition to references cited above, are incorporated by reference herein for all purposes:
(i) ITU-T Rec. T.81|ISO/IEC 10918-1: Information Technology—Digital Compression and Coding of Continuous Tone Still Images—Requirements and Guidelines
(ii) ITU-T Rec. T.86|ISO/IEC 10918-4: Information technology—Digital compression and coding of continuous-tone still images: Registration of JPEG profiles, SPIFF profiles, SPIFF tags, SPIFF colour spaces, APPn markers, SPIFF compression types, and Registration Authorities
(iii) ITU-T Rec. T.871|ISO/IEC 10918-5: Information technology—Digital compression and coding of continuous-tone still images: JPEG File Interchange Format
(iv) ITU-T Rec. T.801|ISO/IEC 15444-1: Information technology—JPEG 2000 Image Coding System; and
(v) IEC 60559 Binary floating-point arithmetic for microprocessor systems.

What is claimed is:

1. A method for decoding with edit detection, the method comprising:
receiving base layer data for a high dynamic range (HDR) image, the base layer data editable by a legacy image viewer;
receiving one or more Application 11 (APP11) marker segments, the one or more APP11 marker segments including (i) an ID string "DD" and (ii) a type, wherein the type is one of a Type 1 parameter American Standard Code for Information Interchange (ASCII) segment, a Type 2 residual segment, and a Type 3 parameter binary segment, wherein the type is identified by one byte in each of the one or more APP11 marker segments, wherein the Type 1 parameter ASCII segment further includes a profile byte following the type, a version byte following the profile byte, a segment index having two bytes following the version byte, and a payload having a maximum of 64 k less 12 bytes following the version byte, and wherein the Type 2 residual segment further includes a segment index having two bytes following the type, and a payload having a maximum of 64 k less 9 bytes following the version byte;
receiving, in the Type 1 parameter ASCII segment, a first checksum parameter for the base layer data and embedded in the one or more APP11 marker segments, the first checksum parameter to be utilized by an HDR decoder and ignored by the legacy image viewer;
receiving, in the Type 2 residual segment, residual ratio data for the HDR image embedded in the one or more APP11 marker segments;
for the HDR decoder:
computing a second checksum parameter for the base layer data; and
comparing the first checksum parameter to the second checksum parameter; and
decoding the HDR image based on the base layer data, the residual ratio data, and a result of comparing the first checksum parameter to the second checksum parameter.

2. The method of claim 1, further comprising:
receiving an encryption parameter in the Type 2 residual segment; and
utilizing the encryption parameter to decrypt the residual ratio data,
wherein utilizing the encryption parameter to decrypt the residual ratio data is performed on a per segment basis, and wherein one segment uses a different encryption parameter than another segment.

3. The method of claim 2, wherein the residual ratio data includes a plurality of segments, wherein the plurality of segments uses a plurality of different encryption parameters.

4. The method of claim 1, wherein the residual ratio data includes a plurality of segments, wherein at least one of the plurality of segments is specified by a coordinate reference, a length and a width, wherein the at least one of the plurality of segments is a rectangular segment.

5. The method of claim 1, wherein the first checksum parameter corresponds to a sum of all bytes of the base layer data.

6. The method of claim 5, wherein the first checksum parameter is computed from a start of frame marker after the one or more APP11 marker segments, up to and including an end of frame marker.

7. The method of claim 1, wherein the first checksum parameter and the second checksum parameter are generated according to a hash function.

8. A method for encoding for edit detection, the method comprising:
receiving a high dynamic range (HDR) image;
determining base layer data and residual ratio data for the high dynamic range (HDR) image, the base layer data configured to be editable by a legacy image viewer;
determining one or more Application 11 (APP11) marker segments, the one or more APP11 marker segments including (i) an ID string "DD" and (ii) a type, wherein the type is one of a Type 1 parameter American Standard Code for Information Interchange (ASCII) segment, a Type 2 residual segment, and a Type 3 parameter binary segment, wherein the type is identified by one byte in each of the one or more APP11 marker segments, wherein the Type 1 parameter ASCII segment further includes a profile byte following the type, a version byte following the profile byte, a segment index having two bytes following the version byte, and a payload having a maximum of 64 k less 12 bytes following the version byte, and wherein the Type 2 residual segment further includes a segment index having two bytes following the type, and a payload having a maximum of 64 k less 9 bytes following the version byte;
computing, by the encoder, a first checksum parameter for the base layer data;
storing, in the Type 1 parameter ASCII segment, the first checksum parameter for the base layer data, the first checksum parameter to be utilized by an HDR decoder and ignored by the legacy image viewer; and
storing, in the Type 2 residual segment, an encryption parameter in the one or more APP11 marker segments for decryption of the residual ratio data,
wherein the HDR decoder is configured to compute a second checksum parameter for the base layer data,
wherein the HDR decoder is configured to compare the first checksum parameter to the second checksum parameter, and
wherein the HDR decoder is configured to decode the HDR image based on the base layer data, the residual ratio data, and a result of comparing the first checksum parameter to the second checksum parameter.

9. The method of claim 8, wherein the HDR decoder is configured to receive the encryption parameter in the Type 2 residual segment,
wherein the HDR decoder is configured to utilize the encryption parameter to decrypt the residual ratio data, and
wherein utilizing the encryption parameter to decrypt the residual ratio data is performed on a per segment basis, and wherein one segment uses a different encryption parameter than another segment.

10. The method of claim 9, wherein the residual ratio data includes a plurality of segments, wherein the plurality of segments uses a plurality of different encryption parameters.

11. The method of claim 8, wherein the residual ratio data includes a plurality of segments, wherein at least one of the plurality of segments is specified by a coordinate reference, a length and a width, wherein the at least one of the plurality of segments is a rectangular segment.

12. A method for decoding with edit detection, the method comprising:
receiving base layer data for a high dynamic range (HDR) image, the base layer data editable by a legacy image viewer;
receiving a first checksum parameter in American Standard Code for Information Interchange (ASCII) representation for the base layer data and embedded in an Application 11 (APP11) marker segment, the first checksum parameter to be utilized by an HDR decoder and ignored by the legacy image viewer;
receiving residual ratio data for the HDR image embedded in the APP11 marker segment;
for the HDR decoder:
computing a second checksum parameter for the base layer data; and
comparing the first checksum parameter to the second checksum parameter; and
decoding the HDR image based on the base layer data, the residual ratio data, and a result of comparing the first checksum parameter to the second checksum parameter,
wherein the residual ratio data includes a plurality of segments, wherein each of the plurality of segments is specified by a coordinate reference, and
wherein at least one of the plurality of segments is specified by the coordinate reference and a radius, wherein the coordinate reference is a center position, and the at least one of the plurality of segments is a circular segment.

13. A method for encoding for edit detection, the method comprising:
receiving a high dynamic range (HDR) image;
determining base layer data and residual ratio data for the high dynamic range (HDR) image, the base layer data configured to be editable by a legacy image viewer;
computing, by the encoder, a first checksum parameter for the base layer data;
storing the first checksum parameter as American Standard Code for Information Interchange (ASCII) representation in an Application 11 (APP11) marker segment for HDR information, the HDR information ignored by the legacy image viewer; and
storing an encryption parameter in the APP11 marker segment for decryption of the residual ratio data,
wherein a HDR decoder is configured to compute a second checksum parameter for the base layer data,
wherein the HDR decoder is configured to compare the first checksum parameter to the second checksum parameter,
wherein the HDR decoder is configured to decode the HDR image based on the base layer data, the residual ratio data, and a result of comparing the first checksum parameter to the second checksum parameter,
wherein the residual ratio data includes a plurality of segments, wherein each of the plurality of segments is specified by a coordinate reference, and
wherein at least one of the plurality of segments is specified by the coordinate reference and a radius, wherein the coordinate reference is a center position, and the at least one of the plurality of segments is a circular segment.

14. A method for decoding with edit detection, the method comprising:
receiving base layer data for a high dynamic range (HDR) image, the base layer data editable by a legacy image viewer;
receiving a first checksum parameter for the base layer data embedded in a segment for HDR information, the first checksum parameter to be utilized by an HDR decoder and ignored by the legacy image viewer;
receiving residual ratio data for the HDR image embedded in the segment for HDR information;
for the HDR decoder:
computing a second checksum parameter for the base layer data; and
comparing the first checksum parameter to the second checksum parameter; and
decoding the HDR image based on the base layer data, the residual ratio data, and a result of comparing the first checksum parameter to the second checksum parameter,
wherein the residual ratio data includes a plurality of segments, wherein each of the plurality of segments is specified by a coordinate reference, and
wherein at least one of the plurality of segments is specified by the coordinate reference and a radius, wherein the coordinate reference is a center position, and the at least one of the plurality of segments is a circular segment.

* * * * *